US012619936B1

(12) United States Patent
Penfield et al.

(10) Patent No.: US 12,619,936 B1
(45) Date of Patent: May 5, 2026

(54) AUTOMATIC ROOT CAUSE AND CORRECTIVE ACTION IDENTIFICATION SYSTEM AND METHOD BASED ON INCIDENT RECORDS

(71) Applicant: VelocityEHS Holdings, Inc., Chicago, IL (US)

(72) Inventors: Julia Penfield, Seattle, WA (US); Pulkit Trushantkumar Parikh, Ontario (CA); Marc L. Juaire, Plymouth, MN (US); Dana C. Garber, Katy, TX (US)

(73) Assignee: VelocityEHS Holdings Inc., Chicago, IL (US)

( * ) Notice: Subject to any disclaimer, the term of this patent is extended or adjusted under 35 U.S.C. 154(b) by 0 days.

(21) Appl. No.: 19/044,209

(22) Filed: Feb. 3, 2025

(51) Int. Cl.
*G06Q 10/0635* (2023.01)
(52) U.S. Cl.
CPC ................................ *G06Q 10/0635* (2013.01)
(58) Field of Classification Search
CPC .................................................. G06Q 10/0635
See application file for complete search history.

(56) References Cited

U.S. PATENT DOCUMENTS

| | | | | |
|---|---|---|---|---|
| 9,122,602 | B1 * | 9/2015 | Jewell | ................. H04L 41/0631 |
| 10,453,015 | B2 * | 10/2019 | Chandra | ................. G06N 20/00 |
| 11,763,235 | B1 * | 9/2023 | Penfield | ............. G06Q 10/0635 |
| | | | | 704/9 |
| 12,056,003 | B1 * | 8/2024 | Ramos | ................. G06F 11/0793 |
| 2009/0313219 | A1 * | 12/2009 | Gupta | .................... G06Q 10/10 |
| 2009/0313505 | A1 * | 12/2009 | McCroskey | .......... G06F 11/006 |
| | | | | 714/E11.178 |
| 2010/0312522 | A1 * | 12/2010 | Laberge | ............. G05B 23/0278 |
| | | | | 702/184 |
| 2011/0214020 | A1 * | 9/2011 | Caspi | .................... H04L 41/064 |
| | | | | 714/E11.029 |
| 2018/0276583 | A1 * | 9/2018 | Karuppasamy | ......... G06F 11/00 |

(Continued)

FOREIGN PATENT DOCUMENTS

| | | | | |
|---|---|---|---|---|
| CA | 2323195 A1 * | 4/2001 | ............. | G06Q 10/10 |

OTHER PUBLICATIONS

Yi et al. "The era of large language models: A case study of STPA using ChatGPT" (Mar. 2025)(https://www.sciencedirect.com/science/article/pii/S2666827025000052) (Year: 2025).*

*Primary Examiner* — Sujay Koneru
(74) *Attorney, Agent, or Firm* — K&L Gates LLP

(57) ABSTRACT

Disclosed herein is a machine learning based system and method for root cause identification and corrective action recommendation to address various workplace incidents. An example system may include a computing device configured to formulate a root cause superset to represent a plurality of root causes, identify fields included in a received incident record in connection with a set of predetermined field descriptors to generate a textual description of the incident record, store data relating to the root cause superset and the textual description of the incident record as a trained model, instruct LLM(s) to determine at least one root cause and corrective action based least upon the textual description of the incident record and the root cause superset, and generate data for a display device to indicate the at least one root cause and corrective action.

20 Claims, 8 Drawing Sheets

(56)                    References Cited

U.S. PATENT DOCUMENTS

| 2019/0294484 | A1* | 9/2019 | Luo ........................ G06N 20/00 |
|---|---|---|---|
| 2020/0226401 | A1* | 7/2020 | Rajagopal ............. G06F 18/214 |
| 2021/0011793 | A1* | 1/2021 | Lehmann .............. G06F 11/079 |
| 2021/0109835 | A1* | 4/2021 | Raghavan ........... G06F 11/3438 |
| 2023/0115475 | A1* | 4/2023 | Alsumail ............... G06N 20/00 |
| | | | 700/79 |
| 2024/0241897 | A1* | 7/2024 | Wang .................. G06F 16/3344 |
| 2025/0077851 | A1* | 3/2025 | Garapati ............. G06N 3/0499 |
| 2025/0130884 | A1* | 4/2025 | Wong ................... G06N 3/0455 |
| 2025/0147754 | A1* | 5/2025 | Kholodkov ............... G06F 8/70 |
| 2025/0165330 | A1* | 5/2025 | Venkatachalam ..... G06F 11/079 |
| 2025/0200628 | A1* | 6/2025 | Bailey ................ G06Q 30/0631 |
| 2025/0245091 | A1* | 7/2025 | Page .................... G06F 11/079 |
| 2025/0307751 | A1* | 10/2025 | Chobe ..................... G06F 40/20 |

* cited by examiner

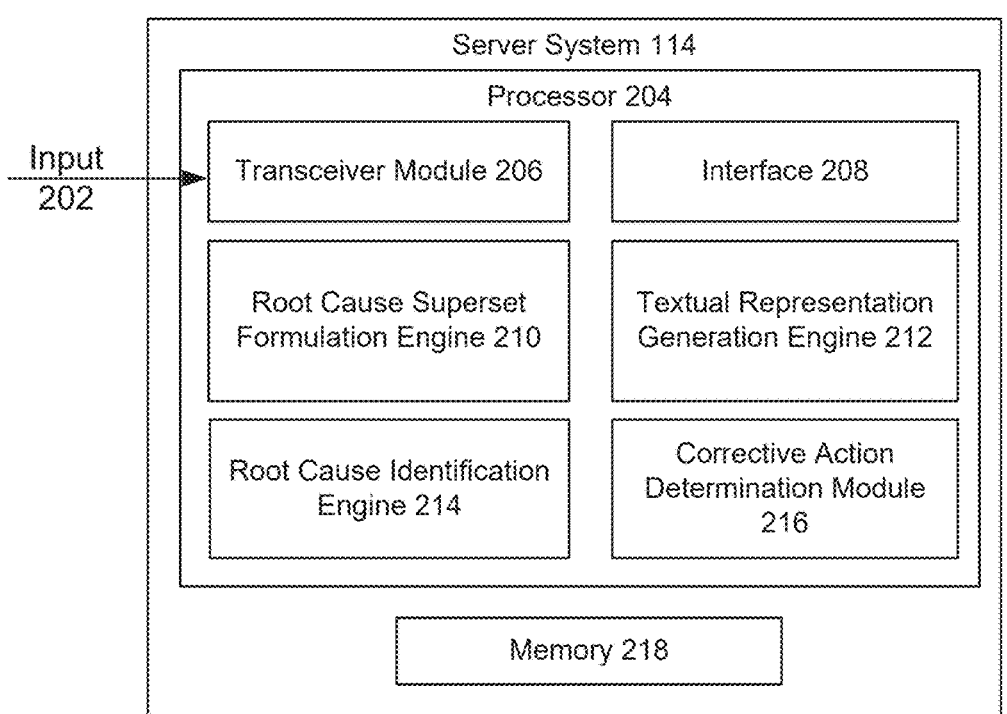

FIG. 2

| Column Category | Description | Example Columns | Example Column Value |
|---|---|---|---|
| Free-text | A column containing unstructured text with a large number of unique values | Title, Description, Task_at_Time_of_Incident, Physical_or_Immediate_C auses_of_Incident | Title: "Employee was lifting a bucket of chemicals onto a forklift when he pulled his back and spilled the bucket" |
| Categorical | A column with a small number of unique textual values | PPE_Worn, Restricted_Work, Reportable_Environmental_ Release | PPE_Worn: "y" |
| Quantity-based | A column containing numeric values and associated textual information such as units | Onsite_Area_Affected, Offsite_Area_Affected, Time_To_Contain, Quantity_Released | Onsite_Area_Affected: "1000 sq ft" |
| Date and time | A column containing date and time information | Date_of_Occurence, Shift_Began | Date_of_Occurence: "2023-01-20 04:26:01" |

302 — (Free-text row)
304 — (Categorical row)
306 — (Quantity-based row)
308 — (Date and time row)

FIG. 3

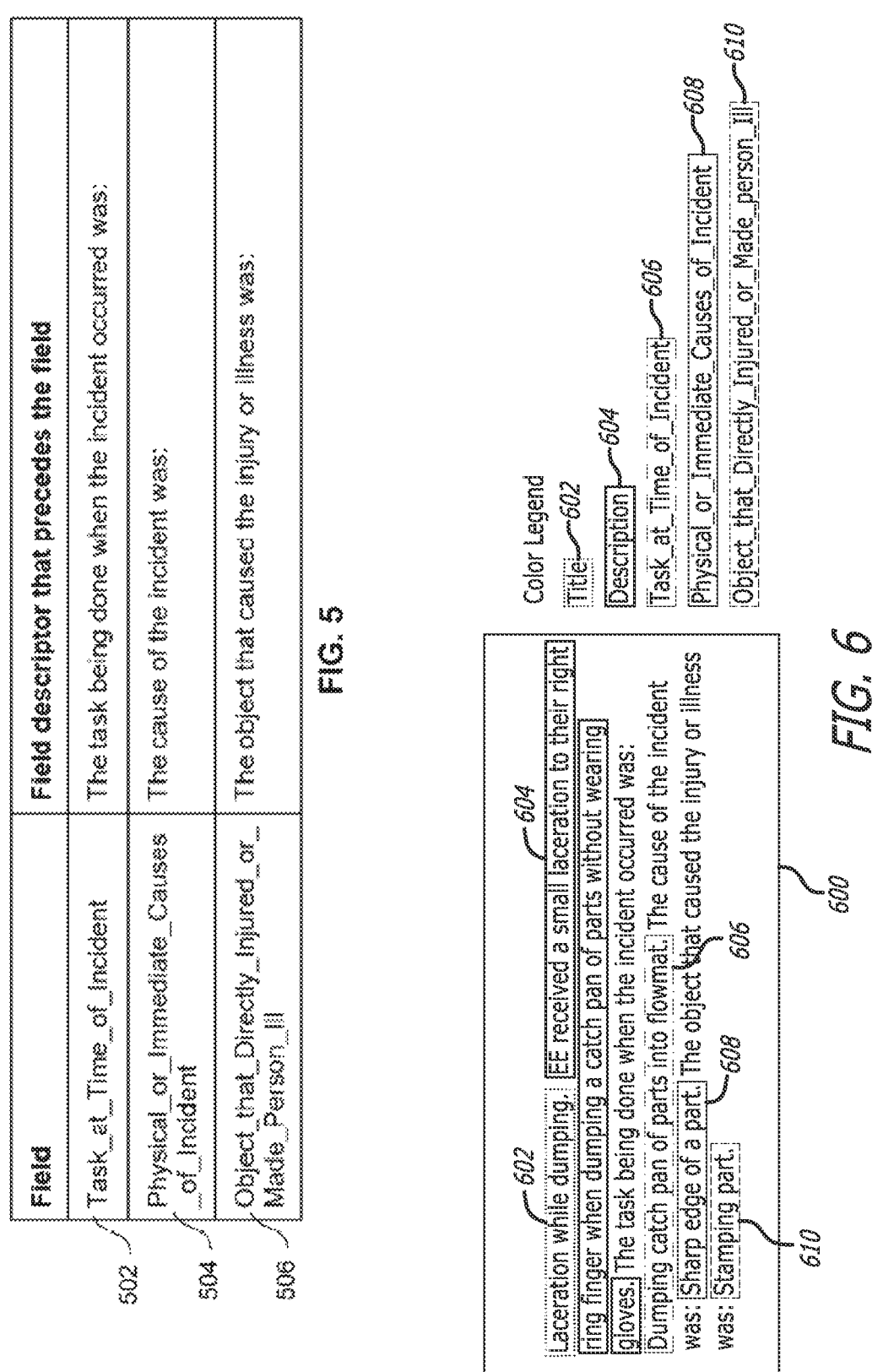

| Field | Field descriptor that precedes the field |
|---|---|
| Task_at_Time_of_Incident | The task being done when the incident occurred was: |
| Physical_or_Immediate_Causes_of_Incident | The cause of the incident was: |
| Object_that_Directly_Injured_or_Made_Person_Ill | The object that caused the injury or illness was: |

Color Legend
Title — 602
Description — 604
Task_at_Time_of_Incident — 606
Physical_or_Immediate_Causes_of_Incident — 608
Object_that_Directly_Injured_or_Made_person_Ill — 610

Laceration while dumping. [EE received a small laceration to their right ring finger when dumping a catch pan of parts without wearing gloves.] The task being done when the incident occurred was: Dumping catch pan of parts into flowmat. The cause of the incident was: Sharp edge of a part. The object that caused the injury or illness was: Stamping part.

| Description | Type of Equipment Failure | PPE Worn | Shift Began | Root Causes Identified | Corrective Actions Recommended |
|---|---|---|---|---|---|
| Team member strained his back when he slipped and fell on ice while walking across the parking lot - from his car to the front door. Team member asked to be seen on Feb 23 (1-day after the accident occurred) at a local Occupational Clinic Team member had back surgery years prior to this accident. | | N | 2022-02-22 08:00:00 | External environment; Work Environment; Hazard identification/ risk assessment | Install additional lighting in parking lot to improve visibility of icy conditions; Contract with snow/ice removal service to ensure timely treatment of parking areas; Designate specific cleared walkways from parking areas to building entrances--Apply anti-slip treatments/materials to walking surfaces in parking lots and walkways; Install weather protection features like awnings over main walkways; Place ice melt/salt stations at key locations for employee use when needed--Implement a formal process for regular inspection of outdoor walking surfaces during winter conditions;Create a system for employees to report hazardous conditions they observe; Develop winter weather safety protocols including communication procedures for hazardous conditions |
| B-3502 pass #1 quality meter tubing leak. The carbon swagelok tubing on the high pressure side of FIT-3331 split causing HP steam to leak out. | Excavation- Damage by Operator | N | | Equipment failure; Preventative maintenance | Implement a comprehensive inspection program for all high-pressure tubing and fittings, with specific focus on swagelok connections; Replace carbon swagelok tubing with more durable materials better suited for high-pressure steam applications; Install pressure monitoring sensors with automatic shutdown capabilities to prevent catastrophic failures--Develop and implement a structured preventive maintenance schedule specifically for pressure-containing equipment and fittings; Create a digital tracking system to ensure timely completion of maintenance tasks and replacement of aging components; Establish clear criteria for equipment replacement based on service life, operating conditions, and inspection results; Provide specialized training to maintenance personnel on proper installation and maintenance of high-pressure tubing systems |

| Description | Type of Equipment Failure | PPE Worn | Shift Began | Root Causes Identified | Corrective Actions Recommended |
|---|---|---|---|---|---|
| Observed overwhelming material on counter in MOS on 31 August, 2021. Concerned due to insufficient space for Operator to work. | | N | 2021-09-01 07:00:00 | Work Environment; ergonomics/physical demands;Safe work practices/procedures | Implement a designated storage area or shelving system to organize MOS materials; Conduct regular workspace audits to ensure adequate bench/counter space is maintained; Establish clear workspace organization standards with marked areas for materials and work---Redesign workstation layout to ensure sufficient working space that allows neutral postures; Install adjustable workbenches that can accommodate different operators and tasks; Provide material handling aids (e.g., sliding shelves, lazy susans) to improve access to materials---Develop and implement a material management procedure that includes maximum allowable quantities at workstations; Train operators on proper housekeeping practices and material organization; Establish a regular schedule for removing excess materials from work areas |
| Truck or plow hit the inlet pipe for the ferment tanks for line 8. Causing pump to be damaged. Need to install some bollards to prevent this from happening again. This is the second time this has happened. | Mechanical Failure | N | 2021-12-16 17:00:00 | Equipment design; Hazard identification/risk assessment; Preventive maintenance | Install protective bollards around the inlet pipe and pump area to prevent vehicle impacts; Consider relocating the inlet pipe/pump to a less vulnerable location away from vehicle traffic areas ---Conduct a formal risk assessment of vehicle movement patterns and potential collision points in the loading dock area; Update site traffic management plan to identify and mark hazardous equipment/infrastructure locations; Implement a near-miss reporting system focused on vehicle-equipment interactions---Establish regular inspections of inlet pipes, pumps and surrounding protection measures; Create a documented maintenance schedule for checking bollard integrity and visibility; Install impact monitoring sensors to detect and report any collisions with the equipment |

AUTOMATIC ROOT CAUSE AND CORRECTIVE ACTION IDENTIFICATION SYSTEM AND METHOD BASED ON INCIDENT RECORDS

FIELD OF TECHNOLOGY

The present disclosure generally relates to a system and method for automatically managing hazards at workplaces, and more particularly relates to a machine learning (ML) based computing system and method for automatically identifying root causes of safety incidents based at least upon obtained incident reports or records and recommending corrective action(s) for each identified root cause.

BACKGROUND

Effective risk management is critical for workplace safety and operational continuity. It can also enhance competitive value and prevent environmental damage. An essential component of risk management is root cause analysis, which involves identifying the underlying causes of incidents. It is typically followed by corrective action recommendation, which involves identifying one or more corrective actions for every root cause identified to prevent the future occurrence of similar incidents.

Traditional approaches to root cause analysis often rely on manual investigation, which can be time-consuming, subjective, and inconsistent across different facilities. Furthermore, the identification of the correct root causes and the recommendation of effective corrective actions typically require highly skilled safety professionals, who are in short supply.

Accordingly, there is a need for a ML based approach for automatically identifying the root causes of safety incidents at workplaces and recommending corrective action(s) for each identified root cause.

SUMMARY

Among other features, in one aspect, the present disclosure relates to a system deployed within a communication network for root cause identification and corrective action recommendation. In one embodiment, a system comprising: a computing device, comprising: a non-transitory computer-readable storage medium storing instructions; and a processor coupled to the non-transitory computer-readable storage medium and configured to execute the instructions to: formulate a first root cause superset to represent a first plurality of root causes of various workplace incidents, obtain an incident record, identify fields included in the incident record in connection with a set of predetermined field descriptors, generate a textual description of the incident record based on selected fields of the incident record corresponding to the set of predetermined field descriptors, store data relating to the first root cause superset and the textual description of the incident record on the non-transitory computer-readable storage medium as a trained model, instruct a first large language model (LLM) to determine at least one root cause of the incident record based at least upon the first root cause superset and the textual description of the incident record, instruct a second LLM to determine at least one corrective action for the at least one root cause based at least upon the textual description of the incident record, and generate data for a display device to indicate the at least one root cause and the at least one corrective action.

In some embodiments, the processor of the computing device may be further configured to execute the instructions to: obtain at least one hazard responsible for the incident record; and instruct the first LLM to determine the at least one root cause of the incident record based at least upon the first root cause superset, the textual description of the incident record, and the at least one hazard.

In yet another embodiment, the processor of the computing device may be further configured to execute the instructions to: obtain a second root cause superset to represent a second plurality of root causes of various workplace incidents within specific organizational or domain contexts; and instruct the first LLM to determine the at least one root cause of the incident record based at least upon the first root cause superset, the textual description of the incident record, the at least one hazard, and the second root cause superset.

In additional embodiments, the processor of the computing device may be further configured to execute the instructions to instruct the second LLM to determine the at least one corrective action for the at least one root cause based at least upon the textual description of the incident record and the at least one hazard responsible for the incident record.

According to certain embodiments, the processor of the computing device may be configured to execute the instructions to formulate the first root cause superset by building a dataset of records of the workplace incidents, each record including a plurality of heterogeneous fields, wherein each of the plurality of heterogeneous fields includes at least one of: a unstructured text input with a number of unique values, a categorical input with a number of unique textual values, a quantity-based input including numeric values and associated textual information, and date and time information relating to a workplace incident.

In addition, the processor of the computing device may be further configured to execute the instructions to instruct the first LLM to produce a structured response to represent the at least one root cause of the incident record using hypertext markup language (XML) tags.

Further, the processor of the computing device may be further configured to execute the instructions to set a tunable parameter of the first LLM to produce the structured response maximally deterministic.

In an embodiment, the processor of the computing device may be further configured to execute the instructions to instruct the second LLM to produce a response to represent the at least one corrective action as a JavaScript Object Notation (JSON) dictionary where the at least one root cause serves as a key.

In another embodiment, the processor of the computing device may be further configured to execute the instructions to modify the at least one root cause of the incident record on the display device based on a user input.

Moreover, the processor of the computing device may be further configured to execute the instructions to modify the at least one corrective action on the display device based on a user input.

In accordance with further aspects, the present disclosure relates to a computer-implemented method, comprising: formulating, by a processor of a computing device, a first root cause superset to represent a first plurality of root causes of various workplace incidents; obtaining, by the processor of the computing device, an incident record; identifying, by the processor of the computing device, fields included in the incident record in connection with a set of predetermined field descriptors; generating, by the processor of the computing device, a textual description of the incident record based on selected fields of the incident record corresponding to the set of predetermined field descriptors; storing, by the processor of the computing device, data relating to the first root cause superset and the textual description of the incident record on the non-transitory computer-readable storage medium as a trained model; instructing, by the processor of the computing device, a first LLM to determine at least one root cause of the incident record based at least upon the first root cause superset and the textual description of the incident record; instructing, by the processor of the computing device, a second LLM to determine at least one corrective action for the at least one root cause based at least upon the textual description of the incident record; and generating, by the processor of the computing device, data for a display device to indicate the at least one root cause and the at least one corrective action.

In an embodiment, the computer-implemented method may further comprise obtaining at least one hazard responsible for the incident record; and instructing the first LLM to determine the at least one root cause of the incident record based at least upon the first root cause superset, the textual description of the incident record, and the at least one hazard.

In another embodiment, the computer-implemented method may further comprise: obtaining a second root cause superset to represent a second plurality of root causes of various workplace incidents within specific organizational or domain contexts; and instructing the first LLM to determine the at least one root cause of the incident record based at least upon the first root cause superset, the textual description of the incident record, the at least one hazard, and the second root cause superset.

In yet another embodiment, the computer-implemented method may further comprise instructing the second LLM to determine the at least one corrective action for the at least one root cause based at least upon the textual description of the incident record and the at least one hazard responsible for the incident record.

In addition, the formulating the first root cause superset may include building a dataset of records of the workplace incidents, each record including a plurality of heterogeneous fields, wherein each of the plurality of heterogeneous fields includes at least one of: a unstructured text input with a number of unique values, a categorical input with a number of unique textual values, a quantity-based input including numeric values and associated textual information, and date and time information relating to a workplace incident.

In another embodiment, the computer-implemented method may further comprise instructing the first LLM to produce a structured response to represent the at least one root cause of the incident record using XML tags.

In one embodiment, the computer-implemented method may further comprise setting a tunable parameter of the first LLM to produce the structured response maximally deterministic.

Moreover, the computer-implemented method may further comprise instructing the second LLM to produce a response to represent the at least one corrective action as a JSON dictionary where the at least one root cause serves as a key.

In an additional embodiment, the computer-implemented method may further comprise modifying the at least one root cause of the incident record on the display device based on a user input.

In yet another embodiment, the computer-implemented method may further comprise modifying the at least one corrective action on the display device based on a user input.

In accordance with additional aspects, the present disclosure may relate to a non-transitory computer readable medium storing computer executable instructions for contemplating the aforementioned system and method.

The above simplified summary of example aspects serves to provide an understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 2 illustrates an example server system of FIG. 1, according to an exemplary aspect of the present disclosure;

FIG. 3 illustrates a number of column categories describing various incidents, according to an exemplary aspect of the present disclosure;

FIG. 5 illustrates a number of field descriptors of incident record fields, according to an exemplary aspect of the present disclosure;

FIG. 6 illustrates an example textual representation of an incident record from select fields, according to an exemplary aspect of the present disclosure;

FIG. 7 illustrates predicted root causes and corrective actions for two incident records represented using a subset of incident record fields, according to an exemplary aspect of the present disclosure;

FIG. 8 illustrates predicted root causes and corrective actions for two additional incident records represented using a subset of incident record fields, according to an exemplary aspect of the present disclosure;

DETAILED DESCRIPTION

Figure 1:
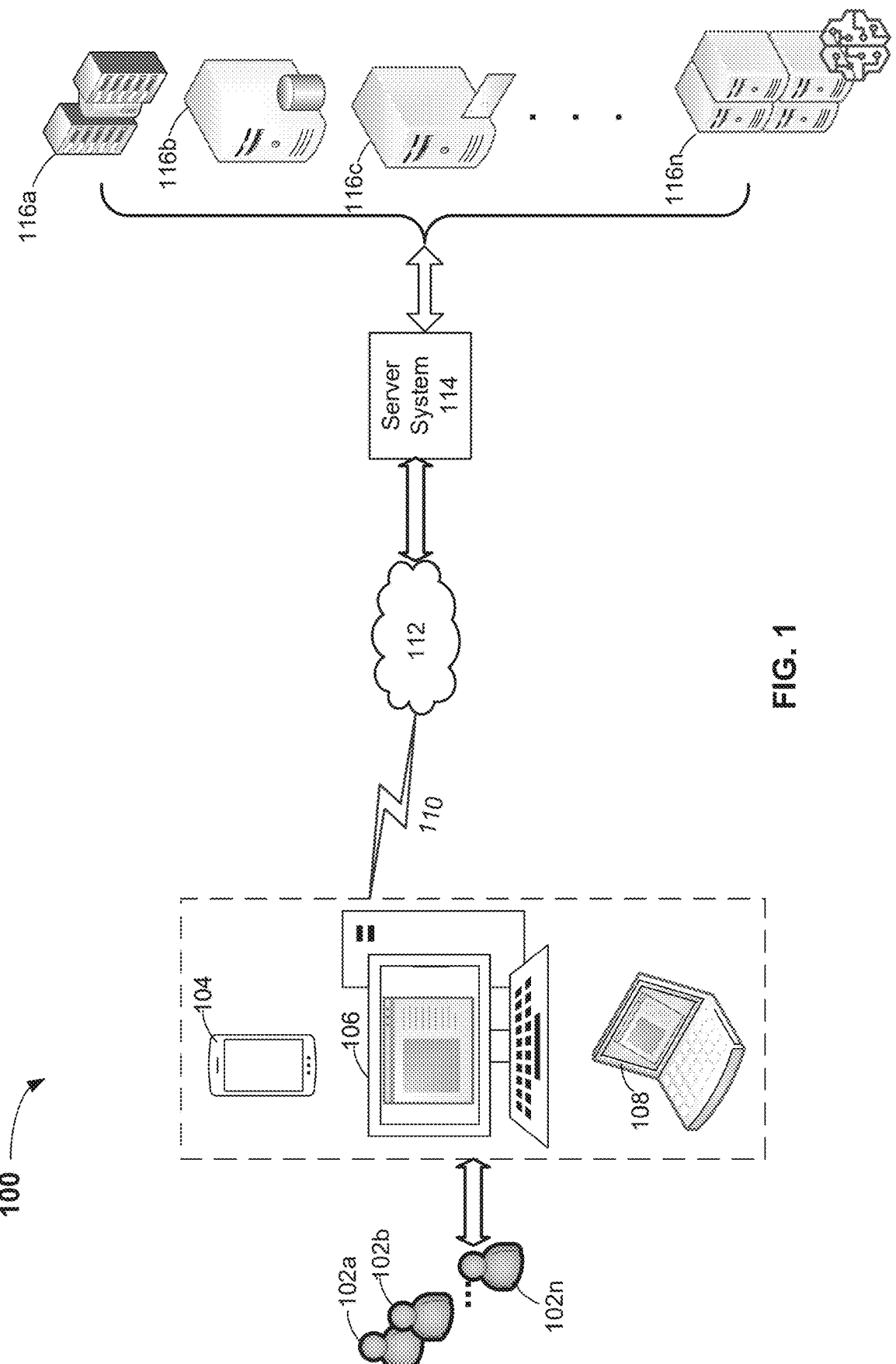
FIG. 1 illustrates a diagram of a computing system for automatically identifying root causes and corrective actions based on incident records, according to an exemplary aspect of the present disclosure.

Various aspects of the present disclosure will be described with reference to the drawings, wherein like reference numerals are used to refer to like elements throughout. In the following description, for purposes of explanation, numerous specific details are set forth in order to promote a thorough understanding of one or more aspects of the present disclosure. It may be evident in some or all instances, however, that any aspects described below can be practiced without adopting the specific design details described below.

In accordance with aspects, the present disclosure employs a ML-based approach for automatically identifying the root causes of safety incidents at workplaces and determining corrective action(s) for each identified root cause. Here, a root cause of a safety incident refers to the fundamental, underlying reason for the occurrence of the incident. It represents the primary source of the problem that, if eliminated or corrected, would prevent the incident from happening again. Root causes often relate to systemic issues rather than immediate or surface-level factors. In one preferred embodiment, advanced generative artificial intelligence (AI) techniques may be employed to create an effective computing system for root cause identification and corrective action recommendation.

FIG. 1 illustrates a diagram of a computing system 100, deployed within a server-based computing environment and communication network, for obtaining a record or report of an incident and automatically predicting one or more root causes applicable to the incident from a predefined list of root causes. A user 102a, 102b, . . . 102n may use a selected computing device or system 104, 106, 108 to input a workplace incident record which may be transmitted to a server system 114, using suitable communication protocol(s) 110 and at least one communication network 112. The input to the computing system 100 of the present disclosure may optionally include a list of hazards applicable to the incident. The predefined list of root causes potentially applicable to an incident may be developed by safety experts. In addition to this predefined list, which may be referred to as the default root cause superset or default superset, a custom root cause superset (e.g., provided by a customer) may be an optional input. The incident record may include a number of heterogeneous fields. In certain implementations, there may not be any labeled data available for training the ML models associated with the computing system 100 for root cause identification and corrective action recommendation.

The communication network 112 may generally include a geographically distributed collection of computing devices or data points interconnected by communication links and segments for transporting signals and data therebetween. The communication protocol(s) 110 may generally include a set of rules defining how computing devices and networks may interact with each other, such as frame relay, Internet protocol (IP), transmission control protocol (TCP), user datagram protocol (UDP), hypertext transfer protocol (HTTP). It should be appreciated that the computing system 100 of the present disclosure may use any suitable communication network, ranging from local area networks (LANs), wide area networks (WANs), cellular networks, to overlay networks and software-defined networks (SDNs), a packet data network (e.g., the Internet), mobile telephone networks (e.g., cellular networks, such as 4G or 5G), Plain Old Telephone (POTS) networks, and wireless data networks (e.g., Institute of Electrical and Electronics Engineers (IEEE) 802.11 family of standards known as Wi-Fi®, WiGig®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), Bluetooth, Near Field Communication (NFC), or any other suitable network.

The server system 114 may be configured to train, host, incorporate or make an application programming interface (API) call to at least one of a plurality of computing systems 116a, 116b, 116c, . . . 116n to process a received incident record and generate responses for root cause and corrective action identification purposes. In a preferred embodiment, the plurality of computing systems 116a, 116b, 116c, . . . 116n may include one or more large language models (LLMs) and/or ML models that can be or have been trained for processing received prompts and data to identify the root causes of the received incident record and determining corrective action(s) for each identified root cause. An LLM is an AI model that may be capable of processing and generating human-like text based on the information it has learned from vast amounts of training data. The term "large" refers to the size of these models in terms of the number of parameters or weights, which are the values that the model learns during training to make predictions and generate text. LLMs may have millions, billions (or even more) parameters, which enable such models to capture complex patterns and nuances in language that, in turn, allow these models to understand and generate more natural-sounding text (relative to previous approaches). Examples of LLMs include the generative pre-trained transformer models (e.g., GPT-3, GPT-4, Codex), Pathways Language Model (PaLM), Gemini, Language Model for Dialogue Applications (LaMDA), Bard, Large Language Model Meta Artificial Intelligence (LLaMA), Claude, Orca, Turing-NLG, Command R, Mistral, Mixtral, Grok, BigScience Large Open-science Open-access Multilingual Language Model (BLOOM), Luminous, Titan, Tongyi Qianwen, Enhanced Representation through Knowledge Integration (ERNIE), PanGu, NeMo, XGen, StableLM, Character LLM, and even non-generative examples such as bidirectional encoder representations from Transformers (BERT), etc.

In some embodiments, the server system 114 may be Cloud-based or an on-site server. The term "server" generally refers to a computing device or system, including processing hardware and process space(s), an associated computer readable storage medium such as a memory device or database, and, in some instances, at least one database application as is well known in the art. The server system 114 may provide functionalities for any connected devices such as sharing data or provisioning resources among multiple client devices, or performing computations for each connected client device. According to one embodiment, within a Cloud-based computing architecture, the server system 114 may provide various Cloud computing services using shared resources. Cloud computing may generally include Internet-based computing in which computing resources are dynamically provisioned and allocated to each connected computing device or other devices on-demand, from a collection of resources available via the network or the Cloud. Cloud computing resources may include any type of resource, such as computing, storage, and networking. For instance, resources may include service devices (firewalls, deep packet inspectors, traffic monitors, load balancers, etc.), computing/processing devices (servers, central processing units (CPUs), graphics processing units (GPUs), random access memory, caches, etc.), and storage devices (e.g., network attached storages, storage area network devices, hard disk drives, solid-state devices, etc.). In addition, such resources may be used to support virtual networks, virtual machines, databases, applications, etc. The term "storage device" or "database," as used herein, may refer to a database (e.g., relational database management system (RDBMS) or structured query language (SQL) database), or may refer to any other data structure, such as, for example a comma separated values (CSV), tab-separated values (TSV), JavaScript Object Notation (JSON), eXtendible markup language (XML), TeXT (TXT) file, flat file, spreadsheet file, and/or any other widely used or proprietary format. In some embodiments, one or more of the databases or data sources may be implemented using one of relational databases, flat file databases, entity-relationship databases, object-oriented databases, hierarchical databases, network databases, NoSQL databases, and/or record-based databases.

Cloud computing resources accessible using any suitable communication network (e.g., Internet) may include a private Cloud, a public Cloud, and/or a hybrid Cloud. Here, a private Cloud may be a Cloud infrastructure operated by an enterprise for use by the enterprise, while a public Cloud may refer to a Cloud infrastructure that provides services and resources over a network for public use. In a hybrid Cloud computing environment which uses a mix of on-premises, private Cloud and third-party, public Cloud services with orchestration between the two platforms, data and applications may move between private and public Clouds for greater flexibility and more deployment options. Some example public Cloud service providers may include Amazon (e.g., Amazon Web Services® (AWS)), IBM (e.g., IBM Cloud), Google (e.g., Google Cloud Platform), and Microsoft (e.g., Microsoft Azure®). These providers provide Cloud services using computing and storage infrastructures at their respective data centers and access thereto is generally available via the Internet. Some Cloud service providers (e.g., Amazon AWS Direct Connect and Microsoft Azure ExpressRoute) may offer direct connect services and such connections typically require users to purchase or lease a private connection to a peering point offered by these Cloud providers.

In one embodiment, an application, which may include a mobile or web-based application (e.g., native iOS or Android Apps), may be downloaded and installed on the selected computing device or system 104, 106, or 108 for interacting with each user 102a, 102b . . . 102n which includes but not limited to employers, ergonomic risk experts, injury prevention specialists, system/network administrators, software developers, and other end-users. Automated agents, scripts, playback software, and the like acting on behalf of one or more people may also be user 102a, 102b . . . 102n. Such a user-facing application of the computing system 100 may include a plurality of modules and libraries executed and controlled by the microcontroller or processor of the hosting computing device or system 104, 106, 108 for performing functions locally on each computing device or making remote calls (e.g., API calls) to the server system 114 to access specific functionalities. The division of labor between local execution and server-side operations depends on how each module or library is designed and what its functions require.

According to some implementations, one or more libraries downloaded on the selected computing device or system 104, 106, 108 may be configured to perform all their operations locally without relying on the server system 114. That is, once a library is installed, it may access the resources and computing power available on each computing device 104, 106, 108 to execute tasks. For example, certain libraries may be configured to perform computations locally using each computing device's CPU/GPU. Further, file handling libraries may be configured to process files stored on the local device. If pre-trained machine learning models are included in the library, they may run locally, depending on each device's capabilities. Local execution of these libraries may not require e.g., Internet connection.

Since there is no network latency, execution is faster for these local operations. Further, there is a greater control over data privacy, since no data needs to be sent to an external server. However, limited by each device's hardware (e.g., memory, processing power), local execution may involve downloading potentially large libraries, models, or datasets.

According to another embodiment, remote execution (server-side processing) may be implemented, and libraries downloaded on each computing device 104, 106, 108 may make remote calls (e.g., API calls) to the server system 114 to access certain functionalities, for example, when the functions a library provides are too resource-intensive for local execution or require access to constantly updated data (e.g., real-time services, large-scale models, or databases). In this case, the library acts as a client-side interface that makes API requests to the server system 114 to perform specific tasks.

In one example, a library may interface with services like OpenAI's GPT, Google Cloud AI, or Amazon S3, where the computation may be carried out on the server system 114, and the selected computing device 104, 106, 108 sends requests and receives results. In another example, libraries like AWS SDK, Google Cloud SDK may allow interaction with Cloud storage to upload, retrieve, and manipulate data on the Cloud.

Server-side processing may offload heavy computation to powerful servers (e.g., at least one of a plurality of computing systems 116a, 116b, 116c, . . . 116n), provide access to real-time data and updated services, and being device-agnostic by working even on devices with limited resources (smartphones, tablets, etc.).

According to additional embodiments, libraries implemented on each selected computing device 104, 106, 108 may adopt a hybrid model, where some operations or computations may be performed locally, while more complex or resource-intensive tasks are offloaded to the server system 114. For example, basic computations, preprocessing, or user interface elements may be handled locally, while complex processing, data retrieval, or heavy computations (e.g., running large AI models or interacting with databases) may be carried out via the server system 114.

Referring now to FIG. 2, at least one processor 204 of the server system 114 may be configured to control and execute a plurality of modules and engines which may include a transceiver module 206, an interface 208, a root cause superset formulation engine 210, a textual representation generation engine 212, a root cause identification engine 214, and a corrective action determination module 220. The term "module" and "engine" as used herein refers to a real-world device, component, or arrangement of components and circuitries implemented using hardware, such as by an application specific integrated circuit (ASIC) or field-programmable gate array (FPGA), for example, or as a combination of hardware and software, such as by a microprocessor system and a set of instructions to implement the module's or engine's functionality, which (while being executed) transform the microprocessor system into a special purpose device. A module or engine may also be implemented as a combination of the two, with certain functions facilitated by hardware alone, and other functions facilitated by a combination of hardware and software. Each module or engine may be realized in a variety of suitable configurations, and should not be limited to any example implementation exemplified herein.

Memory 218, which is coupled to processor 204, may be configured to store at least a portion of information obtained by the server system 114. In one aspect, memory 218 may be a non-transitory computer readable medium configured to store at least one set of data structures or instructions (e.g., software) embodying or utilized by at least one of the techniques or functions described herein. It should be appreciated that the term "non-transitory computer readable medium" may include a single medium or multiple media (e.g., one or more caches) configured to store at least one instruction. The term "computer readable medium" may include any medium that is capable of storing, encoding, or carrying instructions for execution by all modules or engines of the server system 114 and that cause these modules or engines to perform at least one of the techniques of the present disclosure, or that is capable of storing, encoding or carrying data structures used by or associated with such instructions. Non-limiting computer readable medium examples may include solid-state memories, and optical and magnetic media.

Specific examples of computer readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

The transceiver module 206 of the server system 114 may be controlled by processor 204 to exchange various information and data with other computing devices deployed within the communication network 112 and connected with the server system 114 (e.g., computing device or system 104, 106, or 108 and/or the computing systems 116a, 116b, 116c, . . . 116n of FIG. 1).

Interface 208 may be controlled by processor 204 to provide necessary communication and interaction functions between various software components, hardware components, or users. For example, interface 208 may provide a set of functions or protocols for other components to interact with a particular system or service, or be a physical device or circuitry that connects different electronic components or systems. For example, the user-facing application downloaded and installed on each hosting computing device or system 104, 106, or 108 of FIG. 1 may be a thin client device/terminal/application deployed within the computing system 100 and may be configured to perform certain preliminary processing of data relating to any received information from user 102a, 102b . . . 102n. Thereafter, the processed data may be transmitted to the server system 114 for further processing. In one embodiment, interface 208 may include an API interface configured to make one or more API calls therethrough. For example, the computing systems 116a, 116b, 116c, . . . 116n of FIG. 1 may include one or more LLMs and the API interface 208 of the server system 114 may exchange data with each LLM's API. On the other hand, the server system 114 may include an API gateway device (not shown) configured to receive and process API calls from various connected computing devices deployed within the system 100 (e.g., an operating system, a library, a device driver, an API, an application program, software or other module). Such an API gateway device may specify one or more functions, methods, classes, objects, protocols, data structures, formats and/or other features of the server system 114 that may be used by the mobile or web-based application. For example, the API interface included in the interface 208 may define at least one calling convention that specifies how a function associated with the server system 114 receives data and parameters from a requesting device/system and how the function returns a result to the requesting device/system. It should be appreciated that the server system 114 may include additional functions, methods, classes, data structures, and/or other features that are not specified through the API interface and are not available to a requesting computing device.

According to some embodiments, data considered for analysis and experimentation by the server system 114 of the present disclosure may include approximately 935K records (rows), each row providing information about an incident occurred at a workplace. The server system 114 may process multiple incidents (rows) in parallel for improved efficiency. These incidents may be described via a variety of columns (also referred to as fields), ranging from those involving unstructured, free-flowing text to quantity-based fields. An example dataset of the present disclosure may comprise a total of 61 columns. Referring to FIG. 3, four example column categories are illustrated. Specifically, a first column category may include free-text 302 which contains unstructured text with a large number of unique values. Example columns may include a title of the incident, a description of the incident, the task performed at the time of the incident, and the physical or immediate causes of the incident. An example title of the incident in the free-text category 302 may indicate: "Employee was lifting a bucket of chemicals onto a forklift when he pulled his back and spilled the bucket."

A second column category may be categorical 304, referring to a column with a small number of unique textual values. Categorical variables are qualitative values and do not imply a numerical ordering, unlike quantitative values, which are measured in terms of numbers. Usually, a categorical variable may be a value taken from a limited set of values. Example columns of a categorical column 304 may indicate whether personal protective equipment (PPE) was worn by a worker during an incident, whether the incident relates to restricted work, and any reportable environmental release. An example categorical column value may indicate "PPE worn: 'y'".

A third column category may be quantity-based 306, which contains numeric values and associated textual information such as units. Example columns may indicate onsite area affected by a workplace incident, offsite area affected, time to contain, and quantity released. An example column value may indicate "onsite area affected: 1000 sq ft."

A fourth category may include date and time information 308 relating to an incident at a workplace. Example columns may indicate the date of occurrence of the incident and when a shift began. An example column value may indicate "date of occurrence: '2023-01-20 04:26:01'".

It should be appreciated that additional column categories may be added to describe various incidents occurred at workplaces with respect to the nature, context, extent and details of each incident, and the potential root causes.

Figure 4:
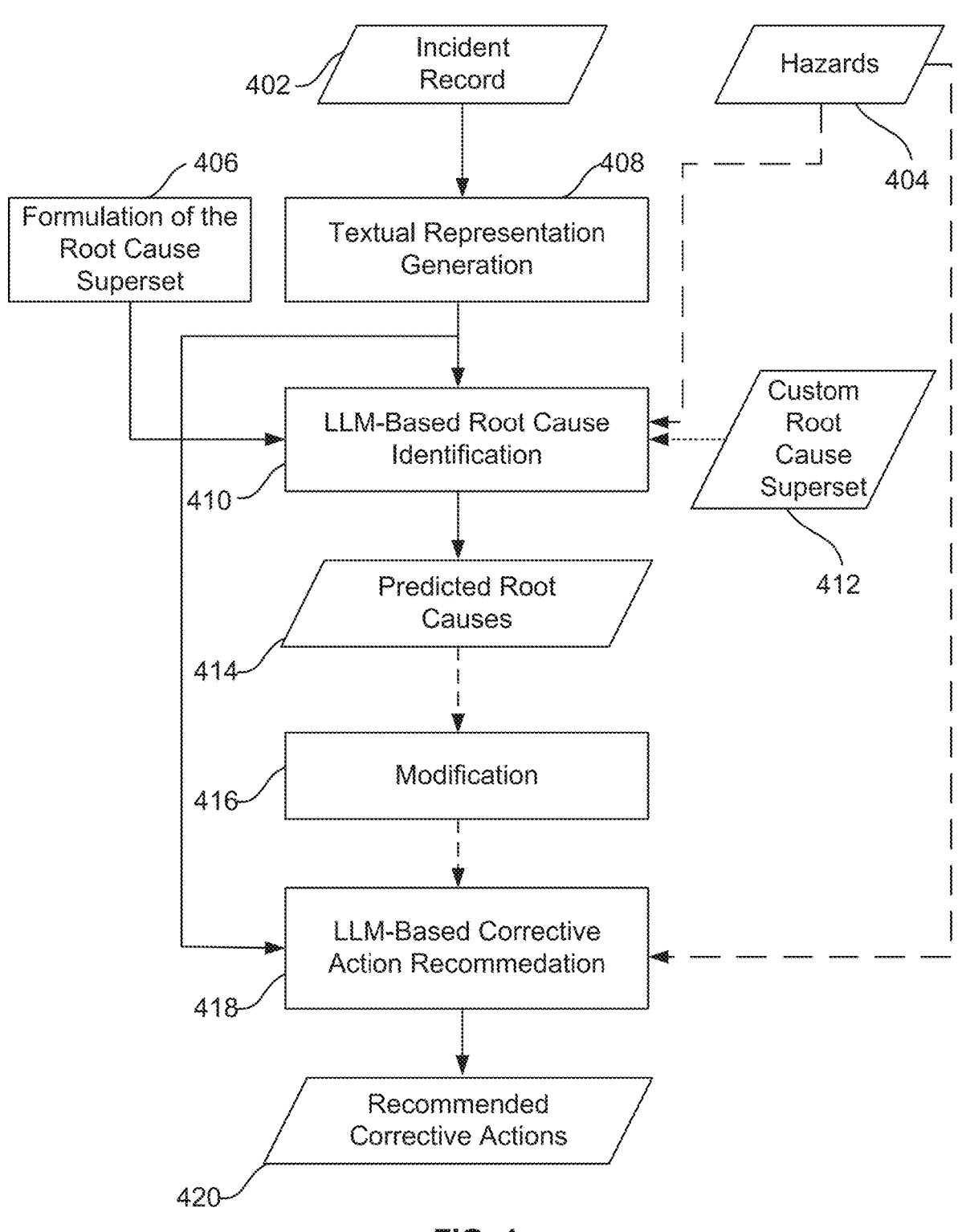
FIG. 4 illustrates a flowchart of a ML based root cause identification and corrective action recommendation method, according to an exemplary aspect of the present disclosure.

FIG. 4 illustrates a flowchart of a ML based root cause identification and corrective action recommendation method that may be carried out by the server system 114 of the present disclosure. According to some implementations, at least one LLM, such as GPT-4o from OpenAI or Claude 3.5 Sonnet from Anthropic, may be incorporated, hosted and trained by the server system 114.

Referring now to FIGS. 2 and 4, a root cause superset formulation engine 210 may be used to identify, establish, store and maintain a comprehensive set of root causes that may be potentially applied to a safety incident. Such a root cause superset may be devised by safety experts (e.g., formulation of the root cause superset 406) and serve as a default root cause superset used by the computing system 100 for processing and analyzing an incident record 402. In an embodiment, the root cause superset formulation engine 210 may distinguish between proximate causes (immediate triggers of a workplace incident) and root causes (systemic issues that allowed the workplace incident to occur). An example subset of this default superset may include management of change (MOC), audit and inspection, preventive maintenance, equipment design, and ergonomic/physical demands.

Specifically, MOC generally refers to the process of systematically evaluating and managing changes in processes, procedures, equipment, or staffing to ensure they do not introduce new risks. While it is typically applied in industrial facilities and operations, it may be implemented in any workplace, especially by those who periodically alter their practices and processes. One of the primary objectives of MOC is to ensure the safety of workers during critical transition periods. Periodic reviews and inspections may ensure compliance with safety standards, procedures, and equipment functionality. In root cause analysis, audit and inspection may identify gaps or inefficiencies in an organization's processes to identify hazards, such as infrequent or superficial inspections failing to detect underlying issues. Further, equipment failure due to inadequate maintenance may have contributed to various workplace incidents, highlighting a systemic oversight in maintenance schedules or practices. Preventive maintenance may include routine maintenance that keeps equipment in safe, functional condition thereby preventing failures. Equipment design refers to the design and configuration of tools, machinery, or systems to ensure safety, usability, and efficiency. Root cause analysis may identify poorly designed equipment that increases risks, such as inadequate safety features or controls that make errors more likely. In addition, the ergonomic/physical demands in root cause analysis may include physical and cognitive demands placed on workers, including factors like posture, force, repetition, and environmental conditions. These physical or ergonomic conditions (e.g., awkward movements, excessive strain) contributed to workplace incidents, potentially exacerbated by a lack of ergonomic considerations in task design.

In some embodiments, the root cause superset formulation engine 210 may be controlled by processor 204 to apply one or more systematic analysis methods to comprehensively identify root causes. For example, one or more Fishbone diagrams may be used to visualize categories and subcategories of root causes. Five "whys" analysis is an iterative approach and focuses on drilling down from the surface-level symptoms of a problem to its underlying causes. This technique is not strictly limited to five "whys", as it may take fewer or more questions to reach the root cause. Further, failure modes and effects analysis may be used to analyze potential points of failure and their impact. In certain situations, a bowtie analysis may be used to map out the chain of events leading to incidents and identify control measures.

In accordance with various aspects, the transceiver module 206 of the server system 114 may be controlled by the processor 204 to receive a request or input 202, via the interface 208, for identifying root causes applicable to an incident record. Such an input 202 may include at least one incident report or record 402 in the form of a document, an email, a text message, a voice message, an image, a video, etc. Each incident record 402 may be composed of a number of heterogeneous fields, as described above with respect to FIG. 3.

The textual representation generation engine 212 may be configured to generate 408 a textual representation of the incident record 402 that is used for prompting at least one LLM. In an aspect, a subset of the incident record fields as shown in FIG. 3 may be identified and utilized for the generation of this textual representation. For example, the textual representation generation engine 212 may process each incident record 402 to impute missing values and rebalance data set (e.g., equalizing sample sizes for different classes), and programmatically combine the contents of these chosen fields in the input incident record 402 using pre-designed field descriptors to create the description representing the incident. More specifically, the content of each subset of the chosen fields may be preceded by a field-specific piece of text describing the field. According to some implementations, these pre-designed field descriptors may include templates or instructions that describe how each field may be represented in text form. As shown in FIG. 3, each descriptor may include a label or description for the data field. For another example, each descriptor may also define the format in which the field may appear in text (e.g., full sentences, bullet points, etc.), and any conditional logic or formatting rules based on the data (e.g., pluralization, capitalizations). In additional embodiments, the generated textual representation may include information contained in non-textual fields, such as the quantity of chemicals released.

The textual representation generation engine 212 may use the pre-designed field descriptors to define a general template that determines the structure of the final textual output. Such a template may be flexible, allowing optional fields to be skipped if no data is provided. Next, the textual representation generation engine 212 may determine templating logic to process input data (which corresponds to the data fields) and use the descriptors to generate a textual representation. For example, the textual representation generation engine 212 may be configured to loop through all available data fields of the input incident record 402, determine whether each data field is required or if there is available data, format the text for each field according to its descriptor, and generate the final textual output 408.

FIG. 5 shows several example field descriptors for some of the fields. Specifically, a first example field 502 in an incident record may specify "Task_at_Time_of_Incident," and the field descriptor that precedes the field 502 is "The task being done when the incident occurred was:." A second example field 504 in an incident record may specify "Physical_or_Immediate_Causes_of_Incident," and the field descriptor that precedes the field 504 is "The cause of the incident was:." Further, a third example field 506 in an incident record may specify "Object_that_Directly_Injured_or_Made_Person_Ill," and the field descriptor that precedes the field 506 is "The object that caused the injury or illness was:." FIG. 6 illustrates an example textual representation of an incident record from select fields. In one embodiment, the left portion of FIG. 6 may represent an incident record 600 which indicates that: "Laceration while dumping. EE received a small laceration to their right ring finger when dumping a catch pan of parts without wearing gloves. The task being done when the incident occurred was: Dumping catch pan of parts into flowmat. The cause of the incident was: Sharp edge of a part. The object that caused the injury or illness was: Stamping part." The textual representation generation engine 212 may analyze the incident record 600 to identify fields based at least upon a plurality of predetermined fields and field descriptors. As shown in the right portion of FIG. 6, different color legends may be used to highlight certain selected fields. For example, the textual representation generation engine 212 may identify a title portion 602 of the incident record 600 which reads "Laceration while dumping" using a first color scheme. Next, a description portion 604, which reads "EE received a small laceration to their right ring finger when dumping a catch pan of parts without wearing gloves.", may be highlighted using a second color scheme. Three additional pre-designed field descriptors 606 ("Task_at_Time_of_Incident"), 608 ("Physical_or_Immediate_Causes_of_Incident"), and 610 ("Object_that_Directly_Injuried_or_Made_Person_Ill") and different color legends may be used to correspond to different portions of the incident record 600 which read "Dumping catch pan of parts into flowmat," "Sharp edge of a part," and "Stamping part," respectively.

The server system 114 may store the root cause superset (s) (e.g., the default and custom supersets) that may be applied to an incident record 402 and the generated textual representation for each incident record 402 in memory 218 as a trained model. In an alternate embodiment, the server system 114 may store information related to the root cause superset and the generated descriptions of incident records in one of the external data sources or computing systems 116a, 116b, 116c, . . . 116n of FIG. 1. As a result, the predictive model of the present disclosure may be trained offline and can be shared across different computing devices deployed within the computing system 100.

Subsequently, as shown in FIGS. 2 and 4, the server system 114 may carry out 410 a ML-based or LLM-based root cause identification of the received incident record 402 using the root cause identification engine 214. In one aspect, the server system 114 may prompt at least one LLM using at least the programmatically generated textual representation of the incident record 402 and the default root cause superset comprising the potential root causes applicable to the incident record 402. If available, hazards 404 responsible for the incident record 402 may be included as a part of the prompt, as the hazards 404 may provide information not contained in the incident record 402. In one embodiment, the hazards 404 may be selected from a ML based multi-label hierarchical hazard categories (not shown) or include free texts entered by a user.

In addition to the default root cause superset, in some implementations, a custom root cause superset 412 may be provided by user 102a, 102b . . . 102n as another input to the at least one LLM to identify root causes of the incident record 402 to the extent possible. In one embodiment, in response to detecting that a custom root cause superset 412 has been provided, the root cause identification engine 214 may be configured to prompt the LLM to identify the root causes of the incident record 402 from the custom root cause superset 412, and identify the root causes of the incident record 402 not covered by the custom superset from the default root cause superset. In the absence of a custom root cause superset 412, the root cause identification engine 214 may prompt the LLM to identify the root causes of the incident record 402 in connection with the default root cause superset.

According to some embodiments, the root cause identification engine 214 may train and instruct the LLM to process and analyze the textual representation generated for each incident record 402 and systematically map it to predefined categories in the default and/or custom root cause supersets 406, 412. For example, the root cause identification engine 214 may instruct the LLM to use its training to interpret and structure the root cause supersets. The default root cause superset may include general categories (e.g., MOC, audit and inspection, preventive maintenance, equipment design, and ergonomic/physical demands). The optional custom root cause superset may include tailored categories reflecting specific organizational contexts or industry nuances (e.g., configuration error, third-party failure). Each root cause category may act as a lens through which the incident details may be examined.

In analyzing the incident against the supersets, the root cause identification engine 214 may instruct the LLM to perform matching by at least scanning the incident description for keywords, phrases, or patterns that correspond to the predefined root cause categories. For example, the phrase that "configuration was incorrect" in the textual representation of the incident record 402 may map to the "configuration error" category, while "deployment failed due to a skipped step" may map to the "human error" category. The root cause identification engine 214 may also instruct the LLM to use natural language understanding to determine the context of each incident record 402 (i.e., contextual understanding). For example, if a service outage occurred after an update, the LLM may be configured to infer connections to categories like "preventive maintenance" (e.g., inadequate testing) or "equipment design" (e.g., software bugs).

For each category in the root cause supersets, the LLM may be configured to evaluate whether it applies based on the information relating to the incident record 402. In an embodiment, the root cause categories in the default and/or custom root cause supersets 406, 412 may be prioritized to best explain the cause(s), and multiple categories may be determined and assigned for complex incidents.

Thereafter, the root cause identification engine 214 may instruct the LLM to generate hypotheses about possible root causes and rank them based on a number of factors including but not limited to relevance (how well the category explains the incident record 402), specificity (whether the category directly addresses the incident's details), and supporting information from the incident description or logs.

The LLM may be configured to format its root cause determinations, linking the incident to relevant root cause categories with explanations. In certain implementations, the root cause identification engine 214 may design one or more prompts to instruct the LLM to format its response using hypertext markup language (XML) tags. Instructing the LLM to produce a structured response makes parsing the response to extract the desired information easier and more reliable and may also improve the response quality. The root cause identification engine 214 of the server system 114 may use regular expressions to extract the list of predicted root causes 414 contained within XML tags.

Alternatively, the root cause identification engine 214 may be configured to adapt the format of the LLM's response to each user 102a, 102b . . . 102n's requirements to ensure that the list of predicted root causes 414 is actionable and fits seamlessly into workflows. For example, JSON may be used for data exchange and can be a good alternative to XML for structured outputs. Tabular formats (e.g., markdown tables) may be useful when the output is to be reviewed in human-readable form, such as documentation or reports. In some cases, hierarchical bullet points may organize information clearly when detailed formatting may not be necessary. YAML is another structured format that is human-readable and used in configuration and scripting contexts. For reports or narratives, structured natural language under headings may provide a professional and human-readable format. When integrating with visualization tools, a flowchart description or steps for graph generation may be included. Further, for integration with data analysis tools, CSV formatting may be used. If the LLM output is intended for integration into other automation or querying systems, the root cause identification engine 214 may request results in SQL-like or pseudo-code formats. For semantic applications or advanced integrations, ontological notations like resource description framework or web ontology language may be employed as well.

According to an aspect, various ML based techniques may be employed to identify root causes for a given incident record 402. As described above, the root cause identification engine 214 may use at least one LLM to perform keyword and sematic matching to detect terms and phrases like "slipped and fell" or "insufficient space for Operator to work" in the textual representation of the incident record 402 to map to specific categories defined in the default and/or custom root cause supersets 406, 412. In an embodiment, the default root cause superset 406 may provide a broad foundation for analyzing general incidents, while the custom root cause superset 412 may add precision by tailoring categories to specific organizational or domain contexts. Contextual inference or understanding may be performed to identify the relationship between incident events and underlying root causes. Further, the root cause identification engine 214 may leverage LLM training data to identify common incident patterns. Categorical hierarchy analysis may be carried out to drill down to subcategories to refine mappings. In certain cases, the root cause identification engine 214 may instruct the LLM to evaluate the incident against multiple categories and select the most likely matches.

All OpenAI chat models and Anthropic LLMs are non-deterministic. In one implementation, the root cause identification engine 214 may set a tunable parameter of the LLM, such that the responses produced by the LLM are maximally deterministic (i.e., as consistent and predictable as possible). In one embodiment, since the temperature parameter of the LLM controls the randomness of the model's output, a lower temperature value may make the LLM more deterministic, while a higher value encourages more creative and diverse responses. For example, the root cause identification engine 214 may set the temperature to 0 or close to 0 for maximal determinism. This may reduce the randomness of root cause identification, making the model chooses the highest-probability option at each step.

According to further aspects, the corrective action determination module 216 of the server system 114 may be configured to employ at least one LLM to determine corrective actions 418 for every root cause identified in the list of predicted root causes 414. In one embodiment, in addition to the root causes identified, the corrective action determination module 216 may instruct the at least one LLM, via a prompt, to perform corrective action recommendation based at least upon the programmatically generated textual representation of the incident record 402 and optionally the hazards 404 responsible for the incident. User 102a, 102b . . . 102n may use a selected computing device or system 104, 106, 108 to make modifications 416 (e.g., adding or removing one or more root causes) to the list of predicted root causes 414 before the identified root causes are used for corrective action recommendation.

In certain implementations, the corrective action determination module 216 may instruct the LLM to format its response as a JSON dictionary wherein the root causes serve as the keys. The recommended corrective actions 420 for each root cause may be formatted and output as a list and included as the corresponding value.

In certain implementations, the corrective action determination module 216 may instruct the LLM to understand the input context including but not limited to the programmatically generated textual representation of the incident record 402, the optional hazards 404 responsible for the incident, the predicted root causes 414, workplace environment, and any other relevant information. Natural language understanding techniques may be used to identify key elements such as incident details describing what happened, root causes indicating why it happened, and other constraints including various organizational, environmental, or regulatory factors. Example LLM training data may be obtained from occupational safety standards (e.g., OSHA, ISO 45001), best practices in hazard identification and mitigation, and general principles of workplace safety and risk management.

Using the input and inferred context, the corrective action determination module 216 may instruct the LLM to organize its response into a structured JSON dictionary format including but not limited to certain example fields:

incident_summary: a concise summary of the incident.

root_cause: a brief description of the identified root causes.

corrective_actions: a list of suggested corrective actions, including details like the action description, responsible parties, and timelines.

risk_level: categorization of the risk (e.g., high, medium, low).

references: any additional resources, standards, or guidelines relevant to the recommendations.

The corrective action determination module 216 may instruct the LLM to output responses that are logically consistent with the details provided in the inputs. If certain fields are unclear or missing, the LLM may be instructed to include placeholders or request further clarification. According to certain implementations, if user preferences or organizational details are provided, the LLM may be instructed to adapt the structure and content of the JSON response accordingly.

FIGS. 7 and 8 illustrate a subset of the fields of several incident records along with the corresponding root causes and corrective actions predicted by the computing system 100 of the present disclosure. While the server system 114 of the present disclosure may make use of all fields of each incident record, only four of the 61 columns are shown in FIGS. 7 and 8 owing to space/presentation considerations. The empty cells in each table of FIGS. 7 and 8 may denote missing values in the data. In some embodiments, in order to provide a mapping between the root causes identified and the sets of corrective actions associated with them, the server system 114 may be configured to separate the sets of corrective actions by a delimiter "—" or other suitable characters and list them in the order of the corresponding root causes.

As shown in FIG. 7, the description of a first incident record 702 may indicate that: "Team member strained his back when he slipped and fell on ice while walking across the parking lot—from his car to the front door. Team member asked to be seen on February 23 (1-day after the accident occurred) at a local Occupational Clinic Team member had back surgery years prior to this accident." The textual representation generation engine 212 of the server system 114 may create data to represent this incident using at least a first column "PPE_Worn" as "N(o)," and a second column "Shift_Began" as "2022-02-22 08:00:00." Thereafter, the root cause identification engine 214 of the server system 114 may instruct at least one LLM to predict one or more root causes of the first incident record 702, as described above. Specifically, the root causes of the first incident record 702 may include the following 3 results: "External environment; Work Environment; Hazard identification/risk assessment." Further, the corrective action determination module 216 may employ at least one LLM to generate the following recommendations to address the 3 identified root causes: "Install additional lighting in parking lot to improve visibility of icy conditions; Contract with snow/ice removal service to ensure timely treatment of parking areas; Designate specific cleared walkways from parking areas to building entrances—Apply anti-slip treatments/materials to walking surfaces in parking lots and walkways; Install weather protection features like awnings over main walkways; Place ice melt/salt stations at key locations for employee use when needed—Implement a formal process for regular inspection of outdoor walking surfaces during winter conditions; Create a system for employees to report hazardous conditions they observe; Develop winter weather safety protocols including communication procedures for hazardous conditions."

The description of a second incident record 704 may indicate that: "B-3502 pass #1 quality meter tubing leak. The carbon swagelok tubing on the high pressure side of FIT-3331 split causing HP steam to leak out." The textual representation generation engine 212 of the server system 114 may use multiple columns to represent the second incident record 704. A first column "Type_of_Equipment_Failure" may indicate that "Excavation-Damage by Operator." A second column "PPE_Worn" has a column value "N(o)." The predicted category of the second incident record 704 may include the following 2 results: "Equipment failure; Preventive maintenance." Further, the corrective action determination module 216 may employ at least one LLM to generate the following recommendations to address the 2 identified root causes: "Implement a comprehensive inspection program for all high-pressure tubing and fittings, with specific focus on swagelok connections; Replace carbon swagelok tubing with more durable materials better suited for high-pressure steam applications; Install pressure monitoring sensors with automatic shutdown capabilities to prevent catastrophic failures—Develop and implement a structured preventive maintenance schedule specifically for pressure-containing equipment and fittings; Create a digital tracking system to ensure timely completion of maintenance tasks and replacement of aging components; Establish clear criteria for equipment replacement based on service life, operating conditions, and inspection results; Provide specialized training to maintenance personnel on proper installation and maintenance of high-pressure tubing systems."

FIG. 8 illustrates two additional examples. Specifically, the description of an incident record 802 may indicate that: "Observed overwhelming material on counter in MOS on 31 August, 2021. Concerned due to insufficient space for Operator to work." The textual representation generation engine 212 of the server system 114 may use multiple columns to represent this incident. For example, a first column "PPE_Worn" has a column value "N(o)" and a second column "Shift_Began" as "2021-09-01 07:00:00." The predicted root causes of the incident record 802 may include the following 3 results: "Work Environment; Ergonomics/physical demands; Safe work practices/procedures." The corrective action determination module 216 may employ at least one LLM to generate the following recommendations to address the 3 identified root causes: "Implement a designated storage area or shelving system to organize MOS materials; Conduct regular workspace audits to ensure adequate bench/counter space is maintained; Establish clear workspace organization standards with marked areas for materials and work—Redesign workstation layout to ensure sufficient working space that allows neutral postures; Install adjustable workbenches that can accommodate different operators and tasks; Provide material handling aids (e.g., sliding shelves, lazy susans) to improve access to materials—Develop and implement a material management procedure that includes maximum allowable quantities at workstations; Train operators on proper housekeeping practices and material organization; Establish a regular schedule for removing excess materials from work areas."

As also shown in FIG. 8, the description of another incident record 804 may state that: "Truck or plow hit the inlet pipe for the ferment tanks for line 8. Causing pump to be damaged. Need to install some bollards to prevent this from happening again. This is the second time this has happened." The textual representation generation engine 212 of the server system 114 may use at least a first column "Type_of_Equipment_Failure" indicating this incident as "Mechanical Failure," a second column "PPE_Worn" as "N(o)," and a third column "Shift_Began" as "2021-12-16 17:00:00." Thereafter, the server system 114 may accordingly identify 3 root causes: "Equipment design; Hazard identification/risk assessment; Preventive maintenance." The recommended corrective actions may include "Install protective bollards around the inlet pipe and pump area to prevent vehicle impacts; Consider relocating the inlet pipe/pump to a less vulnerable location away from vehicle traffic areas—Conduct a formal risk assessment of vehicle movement patterns and potential collision points in the loading dock area; Update site traffic management plan to identify and mark hazardous equipment/infrastructure locations; Implement a near-miss reporting system focused on vehicle-equipment interactions—Establish regular inspections of inlet pipes, pumps and surrounding protection measures; Create a documented maintenance schedule for checking bollard integrity and visibility; Install impact monitoring sensors to detect and report any collisions with the equipment."

Figure 9:
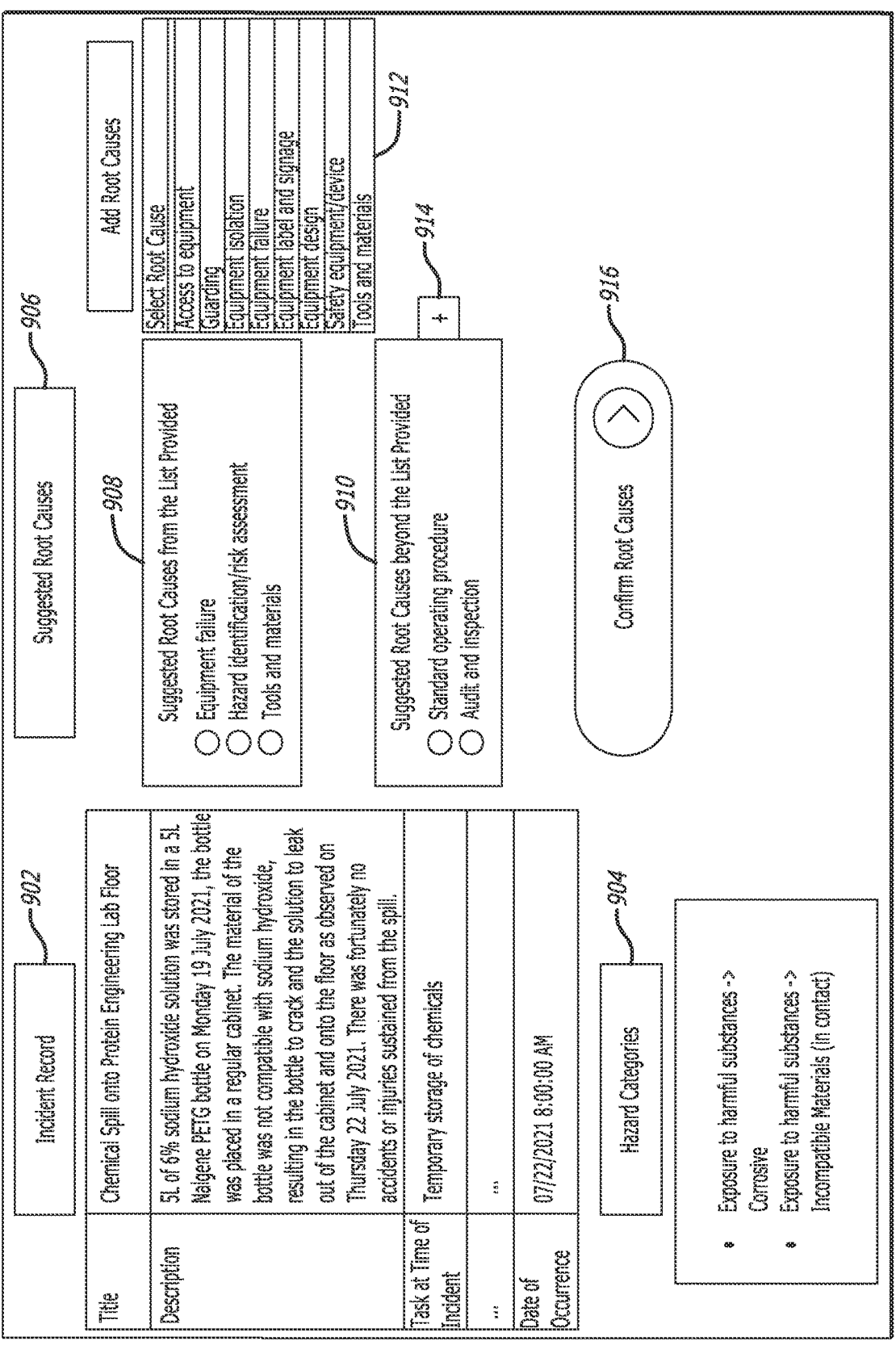
FIG. 9 illustrates an example user interface for root cause identification, according to an exemplary aspect of the present disclosure.
Figure 10:
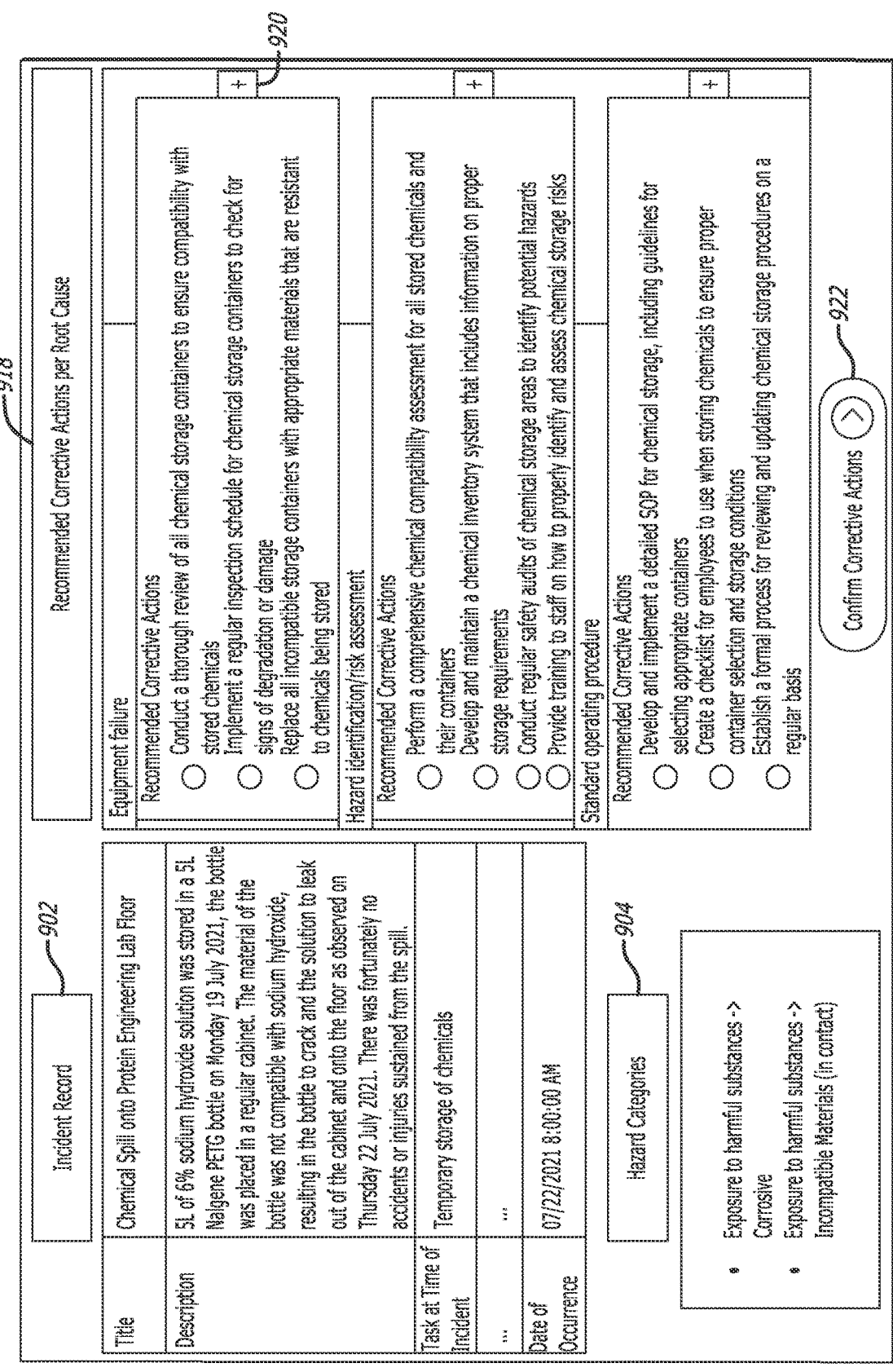
FIG. 10 illustrates an example user interface for corrective action recommendation, according to an exemplary aspect of the present disclosure.

FIGS. 9 and 10 illustrate example user interfaces for displaying the root causes identified by the computing system 100 and the associated corrective actions recommended, in accordance with aspects of the present disclosure. Such user interfaces may be part of an application downloaded and installed on the selected computing device or system 104, 106, or 108. The incident record 902 and the responsible hazard categories 904, if available, may be displayed on the left. The incident record 902 may show details of an incident including but not limited to a title of the incident, a brief description of the incident, the task at time of incident, the date of occurrence, etc.

In the example shown in FIG. 9, a custom root cause superset may be available and used by the computing system 100 for identifying "suggested root causes" 906, as described above. The set of root causes 908 may comprise the root causes of the incident identified from the custom superset. The set of root causes 910 include the root causes of the incident that are not covered by the custom superset but determined based on the default superset. Each identified root cause may be subjected to a user's review and selection via e.g., a radio button. If there are more applicable root causes absent in the nomination identified by the computing system 100, a collapsible "+" button 914 may be used to activate a drop-down menu 912 which displays a number of root causes from the default superset for a user to choose from. Alternatively, the user may type free text to add additional root causes. Conversely, the user may omit root causes identified by computing system 100 by not selecting them. Thereafter, the user may finalize and confirm all the selected identified root causes via the button 916, such that corresponding corrective action recommendations may be generated by the computing system 100.

FIG. 10 shows the recommended corrective actions 918 for every root cause finalized by the user. The set of the root causes finalized by the user may differ from the set of root causes predicted by the computing system 100. The user is given the ability to add any corrective actions found missing via e.g., a collapsible "+" button 920 as well as to reject any system-recommended corrective action deemed inapplicable. The user may finalize and confirm all the selected corrective actions via the button 922, such that all the selected corrective actions may be saved in a data storage unit (e.g., memory 218 of the server system 114 on locally on the selected computing device or system 104, 106, or 108).

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

As used herein, the term "comprising" is not intended to be limiting, but may be a transitional term synonymous with "including," "containing," or "characterized by." The term "comprising" may thereby be inclusive or open-ended and does not exclude additional, unrecited elements or method steps when used in a claim. For instance, in describing a method, "comprising" indicates that the claim is open-ended and allows for additional steps. In describing a device, "comprising" may mean that a named element(s) may be essential for an embodiment or aspect, but other elements may be added and still form a construct within the scope of a claim. In contrast, the transitional phrase "consisting of"

excludes any element, step, or ingredient not specified in a claim. This is consistent with the use of the term throughout the specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted to be prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated.

The invention claimed is:

1. A system deployed within a communication network for root cause identification and corrective action recommendation, the system comprising:
    a computing device, comprising:
        a non-transitory computer-readable storage medium storing instructions; and
        a processor coupled to the non-transitory computer-readable storage medium and configured to execute the instructions to:
            formulate a first root cause superset to represent a first plurality of root causes of various workplace incidents,
            obtain a second root cause superset to represent a second plurality of root causes of various workplace incidents within specific organizational or domain contexts;
            obtain an incident record,
            identify fields included in the incident record in connection with a set of predetermined field descriptors,
            generate a textual description of the incident record based on selected fields of the incident record corresponding to the set of predetermined field descriptors,
            store data relating to the first root cause superset, the second root cause superset, and the textual description of the incident record on the non-transitory computer-readable storage medium as a trained model,
            instruct a first large language model (LLM) to determine at least one root cause of the incident record based at least upon the first root cause superset, the second root cause superset, and the textual description of the incident record by scanning the textual description of the incident record for keywords, phrases, and patterns that correspond to first predefined root cause categories of the second root cause superset representing the second plurality of root causes of various workplace incidents within specific organizational or domain contexts, instructing the first LLM to perform contextual inference or understanding to map the keywords, phrases, and patterns to the first predefined root cause categories of the second root cause superset in accordance with a selected parameter to reduce a randomness of outputs of the first LLM, and in response to determining that there is no match between the keywords, phrases, and patterns and the first predefined root cause categories of the second root cause superset, instructing the first LLM to perform the contextual inference or understanding to map the keywords, phrases, and patterns to second predefined root cause categories of the first root cause superset representing the first plurality of root causes of various workplace incidents,
            instruct a second LLM to determine at least one corrective action for the at least one root cause based at least upon the textual description of the incident record, and
            generate data for a display device to indicate the at least one root cause and the at least one corrective action.

2. The system of claim 1, wherein the processor of the computing device is further configured to execute the instructions to:
    obtain at least one hazard responsible for the incident record; and
    instruct the first LLM to determine the at least one root cause of the incident record based at least upon the first root cause superset, the textual description of the incident record, and the at least one hazard.

3. The system of claim 2, wherein the processor of the computing device is further configured to execute the instructions to:
    instruct the first LLM to determine the at least one root cause of the incident record based at least upon the first root cause superset, the textual description of the incident record, the at least one hazard, and the second root cause superset.

4. The system of claim 2, wherein the processor of the computing device is further configured to execute the instructions to:
    instruct the second LLM to determine the at least one corrective action for the at least one root cause based at least upon the textual description of the incident record and the at least one hazard responsible for the incident record.

5. The system of claim 1, wherein the processor of the computing device is configured to execute the instructions to formulate the first root cause superset by building a dataset of records of the workplace incidents, each record including a plurality of heterogeneous fields, wherein each of the plurality of heterogeneous fields includes at least one of: a unstructured text input with a number of unique values, a categorical input with a number of unique textual values, a quantity-based input including numeric values and associated textual information, and date and time information relating to a workplace incident.

6. The system of claim 1, wherein the processor of the computing device is further configured to execute the instructions to instruct the first LLM to produce a structured response to represent the at least one root cause of the incident record using hypertext markup language (XML) tags.

7. The system of claim 6, wherein the processor of the computing device is further configured to execute the instructions to set a tunable parameter of the first LLM to produce the structured response maximally deterministic.

8. The system of claim 1, wherein the processor of the computing device is further configured to execute the instructions to instruct the second LLM to produce a response to represent the at least one corrective action as a JavaScript Object Notation (JSON) dictionary where the at least one root cause serves as a key.

9. The system of claim 1, wherein the processor of the computing device is further configured to execute the instructions to modify the at least one root cause of the incident record on the display device based on a user input.

10. The system of claim 1, wherein the processor of the computing device is further configured to execute the instructions to modify the at least one corrective action on the display device based on a user input.

11. A computer-implemented method, comprising:

formulating, by a processor of a computing device, a first root cause superset to represent a first plurality of root causes of various workplace incidents;

obtaining, by the processor of the computing device, a second root cause superset to represent a second plurality of root causes of various workplace incidents within specific organizational or domain contexts:

obtaining, by the processor of the computing device, an incident record;

identifying, by the processor of the computing device, fields included in the incident record in connection with a set of predetermined field descriptors;

generating, by the processor of the computing device, a textual description of the incident record based on selected fields of the incident record corresponding to the set of predetermined field descriptors;

storing, by the processor of the computing device, data relating to the first root cause superset, the second root cause superset, and the textual description of the incident record on the non-transitory computer-readable storage medium as a trained model;

instructing, by the processor of the computing device, a first large language model (LLM) to determine at least one root cause of the incident record based at least upon the first root cause superset, the second root cause superset, and the textual description of the incident record by scanning the textual description of the incident record for keywords, phrases, and patterns that correspond to first predefined root cause categories of the second root cause superset representing the second plurality of root causes of various workplace incidents within specific organizational or domain contexts, instructing the first LLM to perform contextual inference or understanding to map the keywords, phrases, and patterns to the first predefined root cause categories of the second root cause superset in accordance with a selected parameter to reduce a randomness of outputs of the first LLM, and in response to determining that there is no match between the keywords, phrases, and patterns and the first predefined root cause categories of the second root cause superset, instructing the first LLM to perform the contextual inference or understanding to map the keywords, phrases, and patterns to second predefined root cause categories of the first root cause superset representing the first plurality of root causes of various workplace incidents;

instructing, by the processor of the computing device, a second LLM to determine at least one corrective action for the at least one root cause based at least upon the textual description of the incident record; and generating, by the processor of the computing device, data for a display device to indicate the at least one root cause and the at least one corrective action.

12. The computer-implemented method of claim 11, further comprising:

obtaining at least one hazard responsible for the incident record; and instructing the first LLM to determine the at least one root cause of the incident record based at least upon the first root cause superset, the textual description of the incident record, and the at least one hazard.

13. The computer-implemented method of claim 12, further comprising:

instructing the first LLM to determine the at least one root cause of the incident record based at least upon the first root cause superset, the textual description of the incident record, the at least one hazard, and the second root cause superset.

14. The computer-implemented method of claim 12, further comprising:

instructing the second LLM to determine the at least one corrective action for the at least one root cause based at least upon the textual description of the incident record and the at least one hazard responsible for the incident record.

15. The computer-implemented method of claim 11, wherein the formulating the first root cause superset includes building a dataset of records of the workplace incidents, each record including a plurality of heterogeneous fields, wherein each of the plurality of heterogeneous fields includes at least one of: a unstructured text input with a number of unique values, a categorical input with a number of unique textual values, a quantity-based input including numeric values and associated textual information, and date and time information relating to a workplace incident.

16. The computer-implemented method of claim 11, further comprising instructing the first LLM to produce a structured response to represent the at least one root cause of the incident record using hypertext markup language (XML) tags.

17. The computer-implemented method of claim 16, further comprising setting a tunable parameter of the first LLM to produce the structured response maximally deterministic.

18. The computer-implemented method of claim 11, further comprising instructing the second LLM to produce a response to represent the at least one corrective action as a JavaScript Object Notation (JSON) dictionary where the at least one root cause serves as a key.

19. The computer-implemented method of claim 11, further comprising modifying the at least one root cause of the incident record on the display device based on a user input.

20. The computer-implemented method of claim 11, further comprising modifying the at least one corrective action on the display device based on a user input.

* * * * *